(12) United States Patent
Mochizuki et al.

(10) Patent No.: US 9,925,934 B2
(45) Date of Patent: Mar. 27, 2018

(54) CORRUGATED TUBE AND WIRE HARNESS FOR SLIDE DOOR

(71) Applicant: YAZAKI CORPORATION, Tokyo (JP)

(72) Inventors: Shota Mochizuki, Shizuoka (JP); Hiroshi Ichikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/341,892

(22) Filed: Nov. 2, 2016

(65) Prior Publication Data

US 2017/0072878 A1   Mar. 16, 2017

Related U.S. Application Data

(63) Continuation of application No. PCT/JP2015/064019, filed on May 15, 2015.

(30) Foreign Application Priority Data

Jun. 2, 2014   (JP) .................................. 2014-113854

(51) Int. Cl.
*H02G 11/00* (2006.01)
*B60R 16/02* (2006.01)
(Continued)

(52) U.S. Cl.
CPC ........ *B60R 16/0215* (2013.01); *B60R 16/027* (2013.01); *F16L 11/11* (2013.01);
(Continued)

(58) Field of Classification Search
USPC ...................................................... 174/68.3
See application file for complete search history.

(56) References Cited

U.S. PATENT DOCUMENTS 6,595,473 B2 * 7/2003 Aoki ........................ F16L 3/10
138/108
7,547,059 B2 * 6/2009 Delaine ............... B60R 16/0222
174/152 G
(Continued)

FOREIGN PATENT DOCUMENTS

JP      2004-248366 A      9/2004
JP      2007-60754 A       3/2007
(Continued)

OTHER PUBLICATIONS

International Search Report and Written Opinion of the International Search Report for PCT/JP2015/064019 dated Jul. 7, 2015.
(Continued)

*Primary Examiner* — Dhirubhai R Patel
(74) *Attorney, Agent, or Firm* — Kenealy Vaidya LLP

(57) ABSTRACT

A corrugated tube having a tube shape is provided with a tubular member configured to contain a conductor path, a first bellows portion, a second bellows portion, and a straight portion. The first bellows portion and the second bellows portion include recessed grooves extending in a circumferential direction of the tubular member and projection strips extending in the circumferential direction of the tubular member. The recessed grooves and projection strips are alternately arranged in a longitudinal direction of the tubular member. In the first bellows portion and the second bellows portion, a pitch which is a distance from one of the recessed grooves to a next recessed groove through one of the projection strips is set as a first distance and a second distance which is longer than the first distance.

3 Claims, 2 Drawing Sheets

(51) Int. Cl.
    *F16L 11/11*     (2006.01)
    *H01B 7/00*     (2006.01)
    *H02G 3/04*     (2006.01)
    *B60R 16/027*     (2006.01)

(52) U.S. Cl.
    CPC ......... *H01B 7/0045* (2013.01); *H02G 3/0468* (2013.01); *H02G 11/00* (2013.01)

(56) References Cited

U.S. PATENT DOCUMENTS

| | | |
|---|---|---|
| 2002/0000499 A1 | 1/2002 | Aoki et al. |
| 2006/0219446 A1 | 10/2006 | Delaine |
| 2007/0044989 A1 | 3/2007 | Nishijima et al. |
| 2009/0000682 A1 | 1/2009 | Kisu et al. |
| 2014/0110012 A1 | 4/2014 | Omura et al. |

FOREIGN PATENT DOCUMENTS

| | | |
|---|---|---|
| JP | 2007-181267 A | 7/2007 |
| JP | 2009-11136 A | 1/2009 |
| JP | 2010-260241 A | 11/2010 |
| JP | 2012-157181 A | 8/2012 |
| JP | 2012-249518 A | 12/2012 |
| JP | 2012-255511 A | 12/2012 |
| JP | 2013-17318 A | 1/2013 |
| JP | 2013-162716 A | 8/2013 |

OTHER PUBLICATIONS

Written Opinion of the International Search Report for PCT/JP2015/064019 dated Jul. 7, 2015.

Japanese Office Action for the related Japanese Patent Application No. 2014-113854 dated Aug. 29, 2017.

Chinese Office Action for the related Chinese Patent Application No. 201580023400.7 dated Sep. 28, 2017.

\* cited by examiner

CORRUGATED TUBE AND WIRE HARNESS FOR SLIDE DOOR

CROSS REFERENCE TO RELATED APPLICATIONS

This application is a continuation of PCT application No. PCT/JP2015/064019, which was filed on May 15, 2015 based on Japanese Patent Application (No. 2014-113854) filed on Jun. 2, 2014, the contents of which are incorporated herein by reference.

BACKGROUND OF THE INVENTION

Field of the Invention

The present invention relates to a corrugated tube and a wire harness for a slide door.

Description of Related Art

In the structure of an ordinary corrugated tube, which is formed in a tube shape and has a bellows portion in which recessed grooves and projection strips extending in a circumferential direction of the tube are alternately arranged in a longitudinal direction of the tube, and in which a conductor path is inserted into the inside of the tube, is used for, for example, a slide door portion of a vehicle in a state where electric wires that are the conductor paths are inserted into the inside of the tube. The corrugated tube is configured of a synthetic resin and has a role to safely protect the electric wires on the inside of the tube from interference with the outside or the like (see Patent Literatures 1 to 9). Moreover, the electric wires are inserted into the inside of the tube and thereby the corrugated tube configures a part of a wire harness.

[Patent Literature 1] JP-A-2009-11136
[Patent Literature 2] JP-A-2013-162716
[Patent Literature 3] JP-A-2007-60754
[Patent Literature 4] JP-A-2012-157181
[Patent Literature 5] JP-A-2007-181267
[Patent Literature 6] JP-A-2004-248366
[Patent Literature 7] JP-A-2013-17318
[Patent Literature 8] JP-A-2012-255511
[Patent Literature 9] JP-A-2012-249518

Meanwhile, a path of the corrugated tube used for a movable portion such as the slide door is regulated by fixing the corrugated tube to the vehicle body and the like by predetermined fixing members at various points. That is, the corrugated tube has a portion that is not to be bent, a portion that is to be bent at a predetermined R or more, a portion that is to be bent less than the predetermined R, and the like. The path is regulated by fixing the corrugated tube to the vehicle body and the like by the predetermined fixing members at various points in accordance with these portions.

According to related arts, a corrugated tube has to be fixed to a vehicle body and a like by using predetermined fixing members and a fixing operation causes an increase in a number of operation steps during mounting of a wire harness for a path regulation. Furthermore, using of the predetermined fixing members leads to an increase in cost by a number of uses of the predetermined fixing members and in a case where the wire harness is a portion that is viewed by a user and a like, and also invites deterioration of appearance.

SUMMARY

One or more embodiments provide a corrugated tube and a wire harness for a slide door in which an increase in cost and deterioration of an appearance can be suppressed while suppressing an increase in a number of operations by reducing a number of uses of predetermined fixing members.

In an aspect (1), one or more embodiments provide a corrugated tube having a tube shape provided with a tubular member configured to contain a conductor path, a first bellows portion, a second bellows portion, and a straight portion. The first bellows portion and the second bellows portion include recessed grooves extending in a circumferential direction of the tubular member and projection strips extending in the circumferential direction of the tubular member. The recessed grooves and projection strips are alternately arranged in a longitudinal direction of the tubular member. In the first bellows portion, a pitch which is a distance from one of the recessed grooves to a next recessed groove through one of the projection strips is set as a first distance. In the second bellows portion, a pitch which is a distance from one of the recessed grooves to a next recessed groove through one of the projection strips is set as a second distance which is longer than the first distance. The straight portion has a straight shape without the recessed groove and the projection strip.

According to the aspect (1), the first bellows portion of which the pitch is set to the first distance, the second bellows portion of which the pitch is set to the second distance longer than the first distance, and the straight portion which is formed in the straight shape are provided. Therefore, it is possible to reduce the number of uses of fixing members for path regulation by forming these portions in advance in accordance with a path. Therefore, an increase in cost and deterioration of an appearance can be suppressed while suppressing an increase in the number of operations.

In an aspect (2), the recessed grooves of the first bellows portion and the recessed grooves of the second bellows portion have the same shape, and the projection strips of the first bellows portion are shorter than the projection strips of the second bellows portion in the longitudinal direction of the tubular member.

According to the aspect (2), the first bellows portion and the second bellows portion have the recessed grooves having the same shape, and the projection strips of the first bellows portion are shorter than the projection strips of the second bellows portion in the longitudinal direction of the tubular member. Here, since a bending degree of the corrugated tube tends to be dominated by a size of a region occupied by the recessed grooves, it is possible to facilitate setting of the bending degree by the number of the recessed grooves in a predetermined length in the longitudinal direction of the tubular member during manufacturing by causing the recessed grooves of the first bellows portion and the second bellows portion to be the same shape.

In an aspect (3), the straight portions are formed in both end portions of the tubular member, the first bellows portion is formed in a center portion in the longitudinal direction of the tubular member, and the second bellows portion is formed between the straight portion and the first bellows portion.

According to the aspect (3), the straight portions are formed in both end portions of the tubular member, the first bellows portion is formed in the center portion in the longitudinal direction of the tubular member, and the second bellows portion is formed between the straight portion and the first bellows portion. Therefore, it is possible to provide the corrugated tube suitable for the slide door which is unlikely to be bent as close to the end portion of the corrugated tube and of which the center portion is reliably mainly bent without substantially bending in the both end portions of the tubular member.

In an aspect (4), a wire harness for a slide door includes the corrugated tube described above and a conductor path that is inserted into an inside of the tubular member.

According to the aspect (4), the corrugated tube and the conductor path inserted into the inside of the corrugated tube are provided. Therefore, it is possible to provide the wire harness for a slide door formed of the corrugated tube and the conductor path inserted into the corrugated tube suitable for the slide door.

Advantageous Effects of Invention

According to one or more embodiments, it is possible to provide the corrugated tube and the wire harness for a slide door in which an increase in cost and deterioration of an appearance can be suppressed while suppressing an increase in the number of operations by reducing the number of uses of predetermined fixing members.

DETAILED DESCRIPTION

Exemplary embodiments are described with reference to the drawings.

Figure 1:
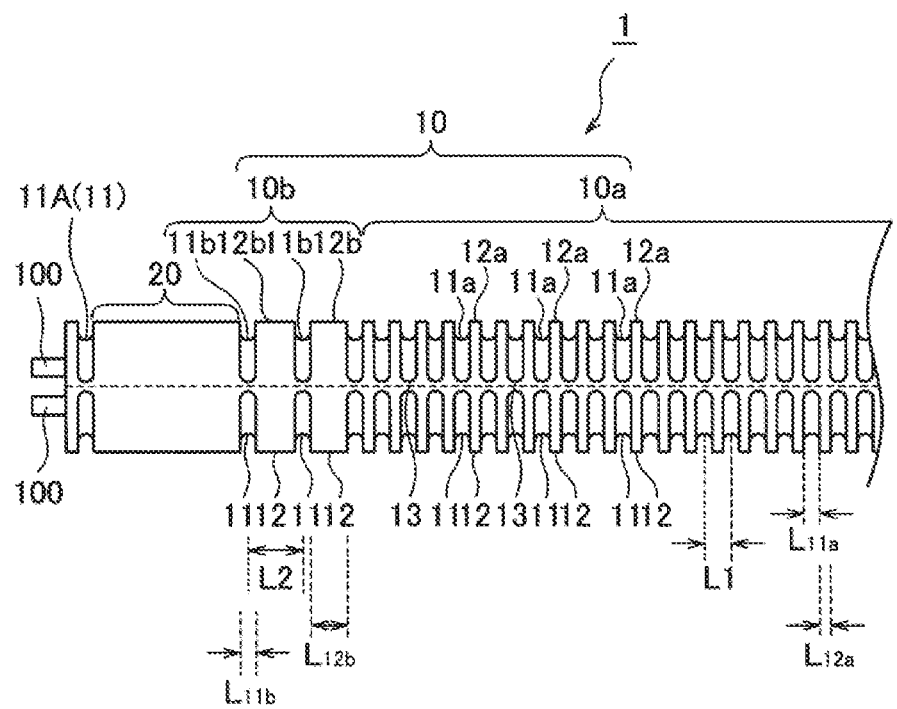
FIG. 1 is a side view illustrating a corrugated tube according to an embodiment.

FIG. 1 is a side view illustrating a corrugated tube according to an embodiment. In addition, a corrugated tube 1 illustrated in FIG. 1 is particularly used for a slide door, but the invention is not particularly limited to the slide door. In addition, one end portion of the corrugated tube 1 is illustrated in FIG. 1, but the other end portion is also has the same configuration.

As illustrated in FIG. 1, the corrugated tube 1 according to the embodiment is formed in a tube shape and electric wires (an example of a conductor path) 100 are inserted into an inside of the tubular member. The corrugated tube 1 may be configured in a circular shape, may be configured in an elliptical shape, or may be configured in a polygonal shape particularly viewed in the cross section as long as the corrugated tube 1 is tubular. In addition, the corrugated tube 1 may include notches that are cut in a longitudinal direction of the corrugated tube 1 or may not be include the notches to dispose the electric wires 100 on the inside thereof.

Such a corrugated tube 1 has a bellows portion 10 in which recessed grooves 11 and the projection strips 12 extending in a circumferential direction of the tubular member are alternately arranged. The bellows portion 10 is likely to be bent in accordance with opening and closing of the slide door.

Such a corrugated tube 1 configures a part of a wire harness in which the electric wires 100 are inserted into the inside of the tubular member. The wire harness has a portion that is not to be bent, a portion that is to be bent at a predetermined R or more, a portion that is to be bent less than the predetermined R, and the like. A path is regulated by fixing the wire harness to a vehicle and the like by the predetermined fixing members in accordance with these portions.

Here, the corrugated tube 1 according to the embodiment has straight portions 20 and the bellows portion 10 is configured of a first bellows portion 10a and a second bellows portion 10b.

The straight portion 20 are portions that are formed in a straight shape without being formed by the recessed grooves 11 and the projection strips 12, and are formed in the both end portions of the tubular member (both end portions of the tubular member are a concept including the vicinity of end portions in which recessed grooves 11A of the corrugated tube 1 as illustrated in FIG. 1, which are described below, are interposed). Therefore, the corrugated tube 1 according to the embodiment is configured such that the both end portions of the tubular member are more unlikely to be bent than the other portions.

The first bellows portion 10a, of which a pitch that is a distance from a recessed groove 11a to the next recessed groove 11a through a projection strip 12a is set to a first distance L1, is formed in a center portion in the longitudinal direction of the tubular member. Moreover, more particularly, the pitch is a distance from an intermediate position of the recessed groove 11a in the longitudinal direction to an intermediate position of the next recessed groove 11a through the projection strip 12a.

On the other hand, the second bellows portion 10b, of which a pitch that is a distance from a recessed groove 11b to the next recessed groove 11b through a projection strip 12b is set to a second distance L2 that is longer than the first distance L1, is formed between the straight portion 20 and the first bellows portion 10a. The definition of the pitch in the second bellows portion 10b is the same as the above description and is a distance from an intermediate position of the recessed groove 11b in the longitudinal direction to an intermediate position of the next recessed groove 11b through the projection strip 12b.

As described above, since the pitches of the first bellows portion 10a and the second bellows portion 10b are different from each other, bending degrees thereof are also different from each other. That is, the second bellows portion 10b is less likely to be bent than the first bellows portion 10a.

Due to such a corrugated tube 1, it is possible to reduce an amount of uses of fixing members for regulating the path if the straight portion 20 is formed in the portion that is not to be bent, the first bellows portion 10a is formed in the portion that is to be bent at a predetermined R or more, and the second bellows portion 10b is formed in the portion that is to be bent less than the predetermined R.

In more detail, the recessed grooves 11a and 11b of the first bellows portion 10a and the second bellows portion 10b have the same shape, and the projection strip 12a of the first bellows portion 10a is formed to be shorter than the projection strip 12b of the second bellows portion 10b in the longitudinal direction of the tubular member.

Figure 2:
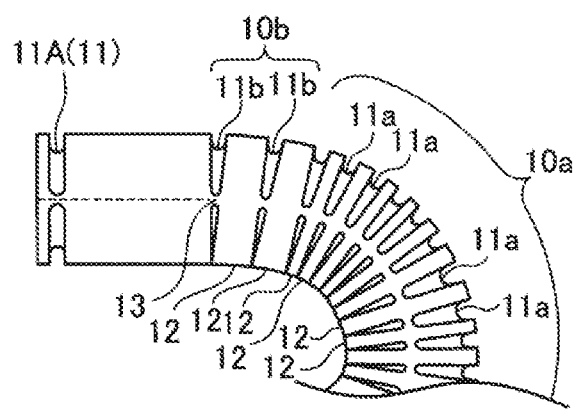
FIG. 2 is a side view illustrating a state of bending of a first bellows portion and a second bellows portion.

Here, the bending degree of the corrugated tube 1 tends to be dominated by a size of a region occupied by the recessed grooves 11a and 11b. FIG. 2 is a side view illustrating a state of bending of the first bellows portion 10a and the second bellows portion 10b.

As illustrated in FIG. 2, in a case where the bellows portion 10 is bent to the maximum, it is possible to be bent until adjacent projection strips 12 come into contact with each other on an inside of the bending. Particularly, in the embodiment, the recessed grooves 11a and 11b of the first bellows portion 10a and the second bellows portion 10b have the same shape. That is, distances L11a and L11b of the recessed grooves 11a and 11b in the longitudinal direction are equal to each other (see FIG. 1). The bending degree is easily set by the number of the recessed grooves 11a and 11b in a predetermined length in the longitudinal direction of the tubular member during manufacturing. That is, the maximum bending is defined by the number of the recessed grooves 11a and 11b in the predetermined length and thereby it is possible to appropriately apply the bending degree to the portion that is to be bent at a predetermined R or more and the portion that is to be bent less than the predetermined R.

Moreover, in order to vary stiffness in the bellows portion 10, it is also considered that the lengths of the projection strips 12 cause to be equal in the first bellows portion 10a and the second bellows portion 10b, and the distances L11a and L11b of the recessed grooves 11a and 11b in the longitudinal direction are different from each other. However, in this case, the distance between the adjacent projection strips 12 is long and thereby the projection strips 12 are unlikely to come into contact with each other and setting of the maximum bending tends to be different during being bent. Therefore, it is further preferable that the recessed grooves 11a and 11b are caused to be the same shape, and the distances L12a and L12b of the projection strips 12a and 12b in the longitudinal direction are different from each other.

In addition, in the corrugated tube 1 according to the embodiment, a single recessed groove 11A is further formed on an end portion side of the straight portion 20. It is possible to absorb a slight force (load applied to the straight portion 20) applied during opening and closing of the slide door by the recessed groove 11A.

In addition, as illustrated in FIGS. 1 and 2, a rib 13 that continues in the longitudinal direction and connects the projection strips 12 to each other is formed in the corrugated tube 1. The rib 13 has the same height as that of the projection strip 12, regulates the bending of the corrugated tube 1 in a direction perpendicular to a paper surface illustrated in FIG. 1, and thereby is intended for causing the bending in a desired direction.

Figure 3:
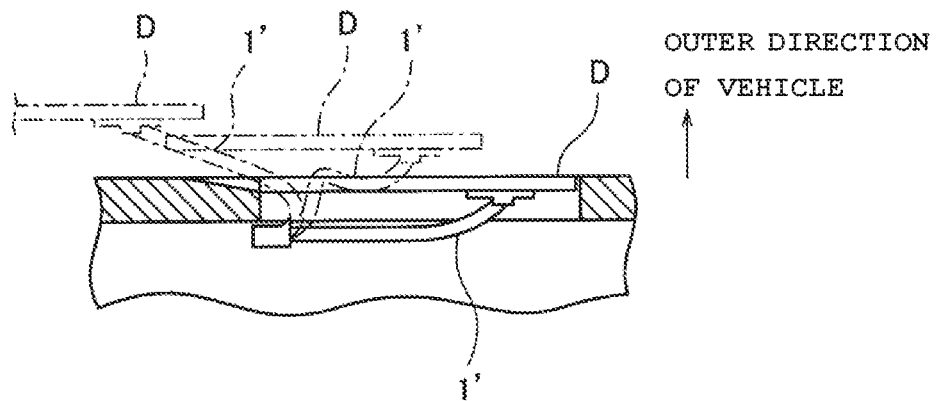
FIG. 3 is a view illustrating a state of bending of a corrugated tube of the related art during opening and closing of a slide door.
Figure 4:
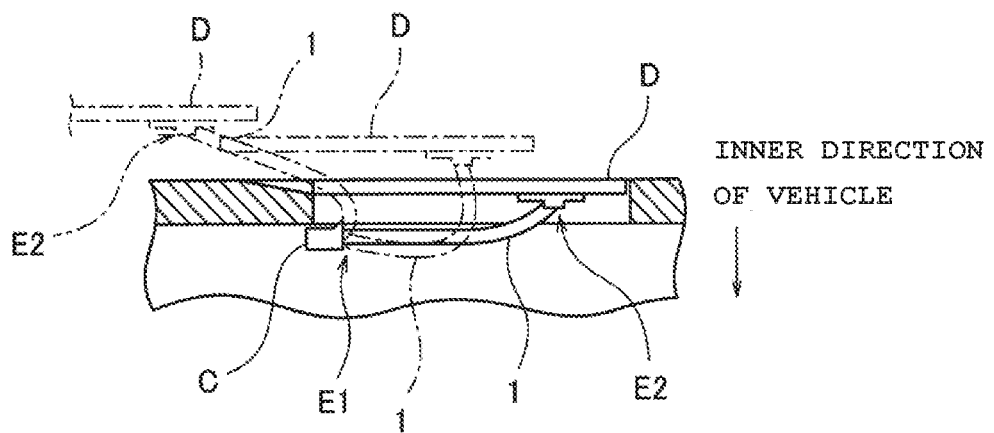
FIG. 4 is a view illustrating a state of bending of the corrugated tube according to the embodiment during opening and closing of a slide door.

Next, an example of the operation of the corrugated tube 1 according to the embodiment will be described. FIG. 3 is a view illustrating a state of bending of a corrugated tube of the related art during opening and closing of a slide door and FIG. 4 is a view illustrating a state of bending of the corrugated tube 1 according to the embodiment during opening and closing of the slide door. Moreover, in FIGS. 3 and 4, a solid line indicates a closed position of a slide door D and a one-dotted chain lines indicate a half-opened position and an opened position of the slide door D.

As illustrated in FIGS. 3 and 4, in both the related art and the embodiment, the corrugated tubes 1 and 1' have the same bending state in the closed position and the opened position of the slide door D.

However, as illustrated in FIG. 3, in the corrugated tube 1' of the related art, for example, there may exhibit unexpected bending (convexly bending in an outer direction of a vehicle) in the half-opened position. In order to prevent this, it is necessary to regulate the bending so as not to be protruded in the outer direction of a vehicle by predetermined fixing members.

In contrast, as illustrated in FIG. 4, in the corrugated tube 1 according to the embodiment, since the straight portion 20 and the like are provided, for example, there does not exhibit unexpected bending (convexly bending in the outer direction of a vehicle) in the half-opened position and bending in an inner direction of a vehicle is maintained.

As described above, in the corrugated tube 1 according to the embodiment, it is possible to reduce the number of uses of predetermined fixing members.

Moreover, as illustrated in the opened position of FIG. 4, an excessive bending force may be applied to a vehicle-side end portion E1 of the corrugated tube 1. It is preferable that a rotation mechanism is provided as in a door-side end portion E2 so that the corrugated tube 1 does not the conductive metal off due to the excessive being force. In the embodiment, since the single recessed groove 11A is further formed on the end portion side of the straight portion 20, it is possible to mitigate such an excessive bending force. As a result, in a case where the corrugated tube 1 is connected to a connector C, it is possible to prevent the corrugated tube 1 from being completely detached from the connector C.

As described above, according to the corrugated tube 1 of the embodiment, the first bellows portion of which the pitch is set to the first distance, the second bellows portion of which the pitch is set to the second distance that is longer than the first distance, and the straight portion which is formed in the straight shape are provided. Therefore, it is possible to appropriately set the portion to be bent and the bending degree without the fixing members for regulating the path. As a result, it is possible to reduce the number of uses of the fixing members for regulating the path. Therefore, an increase in cost and deterioration of an appearance can be suppressed while suppressing an increase in the number of operations.

In addition, the first bellows portion and the second bellows portion have the same shape in the recessed grooves and the projection strip of the first bellows portion is formed to be shorter than the projection strip of the second bellows portion in the longitudinal direction of the tubular member. Here, the bending degree of the corrugated tube tends to be dominated by the size of the region occupied by the recessed grooves. Therefore, it is possible to facilitate setting of the bending degree by the number of the recessed grooves in a predetermined length in the longitudinal direction of the tubular member during manufacturing by causing the recessed grooves of the first bellows portion and the second bellows portion to be the same shape.

In addition, the straight portions are formed in both end portions of the tubular member, the first bellows portion is formed in the center portion in the longitudinal direction of the tubular member, and the second bellows portion is formed between the straight portion and the first bellows portion. Therefore, it is possible to provide the corrugated tube suitable for the slide door which is unlikely to be bent as close to the end portion of the corrugated tube and of which the center portion is mainly bent without substantially bending in the both end portions of the corrugated tube.

In addition, according to the wire harness of the embodiment, the corrugated tube and the conductor path inserted into the inside of the corrugated tube are provided. Therefore, it is possible to provide the wire harness for the slide door formed of the corrugated tube and the conductor path inserted into the corrugated tube suitable for the slide door.

The invention is described with reference to the embodiment described above, but the invention is not limited to the above embodiment, and changes may be made without departing from the scope of the invention.

For example, in the embodiment, an example in which the corrugated tube 1 is used for the slide door D is illustrated, but the invention is not limited to the example, and the corrugated tube 1 may be used for other portions, or may be used for others than the vehicle.

Here, each of features of the embodiment of the corrugated tube according to the invention is concisely listed in the following [1] to [4]:

[1]

A corrugated tube (1) having a tube shape comprising:
a tubular member configured to contain a conductor path;
a first bellows portion (10a);
a second bellows portion (10b); and
a straight portion (20),
wherein the first bellows portion and the second bellows portion include recessed grooves (11, 11a, 11b, and 11A) extending in a circumferential direction of the tubular member and projection strips (12, 12a, and 12b) extending in the circumferential direction of the tubular member,
wherein the recessed grooves and projection strips are alternately arranged in a longitudinal direction of the tubular member,
wherein in the first bellows portion, a pitch which is a distance from one of the recessed grooves to a next recessed groove through one of the projection strips is set as a first distance (L1),
wherein in the second bellows portion, a pitch which is a distance from one of the recessed grooves to a next recessed groove through one of the projection strips is set as a second distance (L2) which is longer than the first distance, and
wherein the straight portion has a straight shape without the recessed groove and the projection strip.

[2]

The corrugated tube according to [1],
wherein the recessed grooves of the first bellows portion and the recessed grooves of the second bellows portion have the same shape, and
wherein the projection strips of the first bellows portion are shorter than the projection strips of the second bellows portion in the longitudinal direction of the tubular member.

[3]

The corrugated tube according to [1] or [2],
wherein the straight portions are formed in both end portions of the tubular member,
wherein the first bellows portion is formed in a center portion in the longitudinal direction of the tubular member, and
wherein the second bellows portion is formed between the straight portion and the first bellows portion.

[4]

A wire harness for a slide door comprising
the corrugated tube according to [3], and
the conductor path that is inserted into the inside of the tubular member.

The invention is described in detail with reference to a specific embodiment, but it will be apparent to those skilled in the art that various changes and modifications can be provided without departing from the sprit and scope of the invention.

INDUSTRIAL APPLICABILITY

According to the invention, it is possible to provide the corrugated tube and the wire harness for the slide door in which an increase in cost and deterioration of an appearance can be suppressed while suppressing an increase in the number of operations by reducing the number of uses of predetermined fixing members. The invention achieving this effect is useful for the corrugated tube and the wire harness for the slide door.

REFERENCE SIGNS LIST

1: corrugated tube
10: bellows portion
10a: first bellows portion
10b: second bellows portion
11, 11a, 11b, 11A: recessed groove
12, 12a, 12b: projection strip
13: rib
20: straight portion
100: electric wire
C: connector
D: slide door
E1: vehicle-side end portion
E2: door-side end portion
L1: first distance
L2: second distance

What is claimed is:

1. A corrugated tube having a tube shape comprising:
a tubular member configured to contain a conductor path;
a first bellows portion;
a second bellows portion; and
a straight portion,
wherein the first bellows portion and the second bellows portion include recessed grooves extending in a circumferential direction of the tubular member and projection strips extending in the circumferential direction of the tubular member,
wherein the recessed grooves and projection strips are alternately arranged in a longitudinal direction of the tubular member,
wherein in the first bellows portion, a pitch which is a distance from one of the recessed grooves to a next recessed groove through one of the projection strips is set as a first distance,
wherein in the second bellows portion, a pitch which is a distance from one of the recessed grooves to a next recessed groove through one of the projection strips is set as a second distance which is longer than the first distance,
wherein the straight portion has a straight shape without the recessed groove and the projection strip,
wherein the recessed grooves of the first bellows portion and the recessed grooves of the second bellows portion have the same shape, and
wherein the projection strips of the first bellows portion are shorter than the projection strips of the second bellows portion in the longitudinal direction of the tubular member.

2. A corrugated tube having a tube shape comprising:
a tubular member configured to contain a conductor path;
a first bellows portion;
a second bellows portion; and
a straight portion,
wherein the first bellows portion and the second bellows portion include recessed grooves extending in a circumferential direction of the tubular member and projection strips extending in the circumferential direction of the tubular member,
wherein the recessed grooves and projection strips are alternately arranged in a longitudinal direction of the tubular member, wherein in the first bellows portion, a pitch which is a distance from one of the recessed grooves to a next recessed groove through one of the projection strips is set as a first distance, wherein in the second bellows portion, a pitch which is a distance from one of the recessed grooves to a next recessed groove through one of the projection strips is set as a second distance which is longer than the first distance, wherein the straight portion has a straight shape without the recessed groove and the projection strip, wherein the straight portions are formed in both end portions of the tubular member, wherein the first bellows portion is formed in a center portion in the longitudinal direction of the tubular member, wherein the second bellows portion is formed between the straight portion and the first bellows portion, and wherein the projection strips of the first bellows portion are shorter than the projection strips of the second bellows portion in the longitudinal direction of the tubular member.

3. A wire harness for a slide door comprising the corrugated tube according to claim 2, and the conductor path that is inserted into an inside of the tubular member.

\* \* \* \* \*